United States Patent Office 2,906,789
Patented Sept. 29, 1959

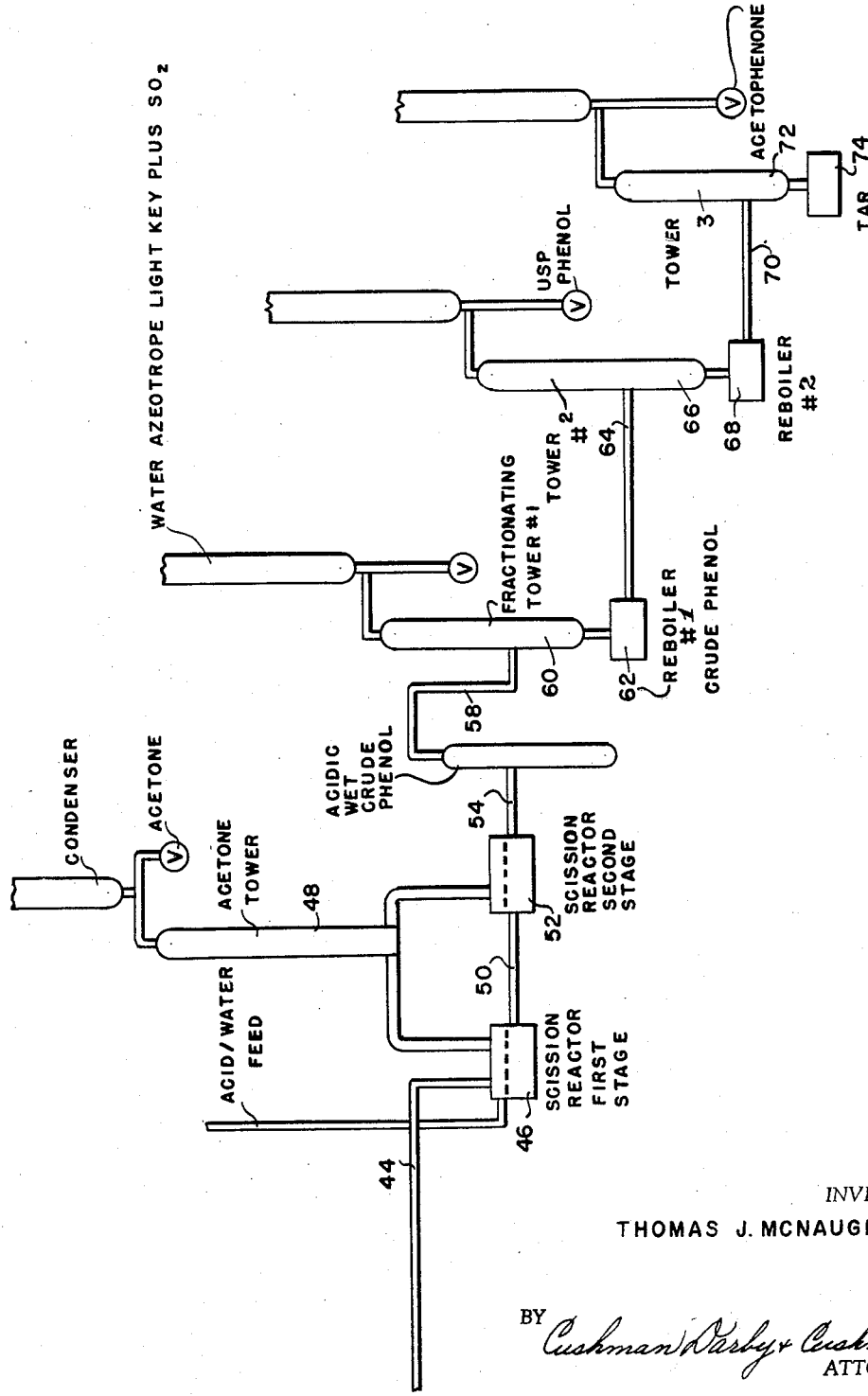

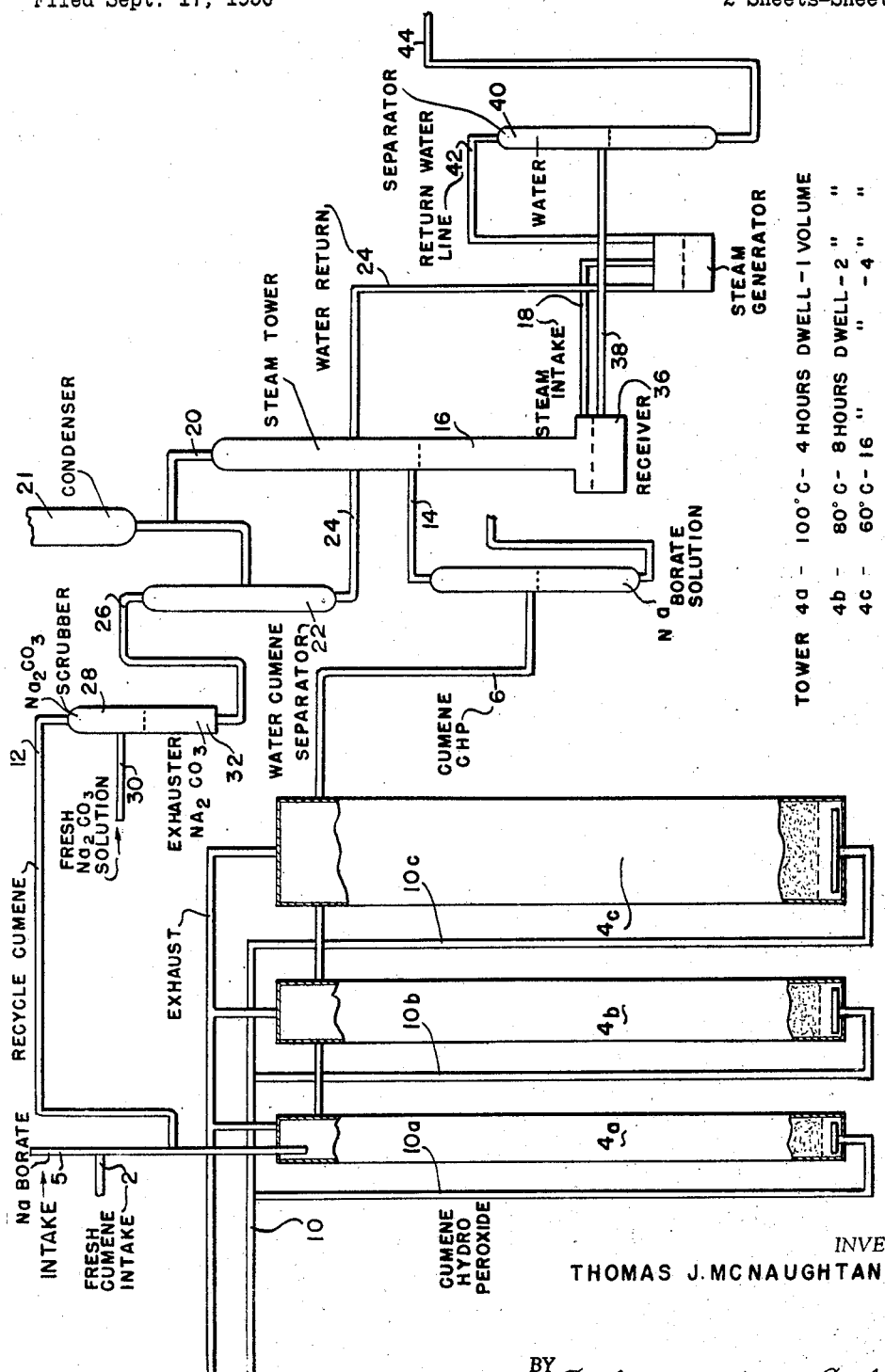

2,906,789

MANUFACTURE OF PHENOL FROM CUMENE

Thomas J. McNaughtan, Schenectady, N.Y., assignor to Schenectady Varnish Company, Inc., a corporation of New York Application September 17, 1956, Serial No. 610,216

4 Claims. (Cl. 260—674)

The present invention relates to the preparation of phenol from cumene.

This procedure has attained considerable commercial importance since the disclosure by Hock and Lange, Berichte, vol. 77, 1944, pages 257–264, that cumene can be oxidized to cumene hydroperoxide and the cumene hydroperoxide then decomposed to form phenol and acetone. Numerous patents have subsequently issued on this general procedure, but there are certain steps in the process which require improvement.

Thus, there is a problem in preparing the cumene so that it can readily be oxidized to cumene hydroperoxide. Additionally, there is the problem of reducing the formation of by-products in such oxidation. Furthermore, problems have arisen in the separation of the cumene from the cumene hydroperoxide. Additionally, there are problems in attaining the maximum yields of phenol and acetone in the shortest period of time.

Accordingly, it is an object of the present invention to improve the efficiency of the process for forming phenol from cumene.

An additional object is to devise an improved method for removing impurities from cumene so that the cumene can be used to form cumene hydroperoxide more rapidly.

A further object is to reduce by-product formation in the production of cumene hydroperoxide from cumene.

Another object is to simplify the separation of cumene from cumene hydroperoxide.

A still further object is to prepare phenol and acetone in good yields from cumene hydroperoxide in a novel and rapid manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the following specification and claims unless otherwise stated, all parts and percentages are by weight.

The oxidation of cumene to cumene hydroperoxide is an extremely sensitive process, in that extremely small traces of contaminating materials can terminate the oxidation or inhibit the reaction entirely. Thus, when air was bubbled through commercial Dow Chemical Company cumene for 24 hours at 100° C., there was obtained only 0.09% of cumene hydroperoxide based on the amount of cumene employed. When another sample of the commercial Dow cumene was distilled through a 100 plate column, the center cut boiling at 59° C. at 1 mm. removed and oxidized for 24 hours by bubbling air through it at 100° C., there was obtained only 0.26% of cumene hydroperoxide.

Metallic poisons of the tin family are especially harmful, as are acidic and phenolic products. The cumene recovered from the process of producing phenol from cumene hydroperoxide normally contains traces of such materials, and is not suitable for use in the oxidation process, unless specially refined prior to use. Such refining processes consist of treatment with strong acidic material to remove metal contaminates, treating with strong alkali to neutralize and remove the phenolic materials and finally a distillation process is employed to obtain a substantially pure cumene suitable for oxidation processing. A typical illustration of such a process is given in Example 1.

EXAMPLE 1

2000 grams of commercial Dow cumene were shaken with two 200 cc. portions of 96% sulfuric acid and the hydrocarbon layer separated each time. The acid washed cumene was then washed with two 200 cc. portions of 25% sodium hydroxide. The alkali washed hydrocarbon was then washed with two 200 cc. portions of distilled water and the hydrocarbon layer fractionated at 1 mm. pressure. The 59° C. cut was taken and oxidized for 24 hours at 100° C. by bubbling air therethrough. Cumene hydroperoxide was obtained in a yield of 41.3%. The pH of the final mixture was 6.1. The yield of cumene hydroperoxide in this and the other examples in the present specification was determined in conventional fashion by the iodometrical method employing potassium iodide.

It has now been found that the purification of impure cumene to give cumene which will form superior yields of cumene hydroperoxide can be accomplished by employing sodium carbonate or sodium borate as a pretreating agent. The impure cumene is passed through a tower containing an aqueous solution of the sodium carbonate or sodium borate to accomplish the purification. The phenolic materials are successfully extracted from the cumene, the acidic materials are neutralized and extracted and the tin ions form sodium stannate which is water soluble. Sodium borate is preferred to sodium carbonate since sodium borate will chelate and remove certain poisons such as tin, arsenic and selenium, which are not removed by sodium carbonate. The sodium carbonate and sodium borate are generally employed as a 2 to 20% aqueous solution at a pH of 6–12, preferably about 8.

A simple method of carrying out the purification is to push the crude cumene through a packed tower filled with the aqueous solution of sodium carbonate or borate and then to allow the cumene to overflow through a separator into the oxidation chamber. The cumene and sodium salt solution can be in either concurrent or countercurrent flow. The purification process works satisfactorily both with impure commercial cumene and with residual cumene which is recycled from the separation of cumene from cumene hydroperoxide or the cumene separated in the conversion of cumene hydroperoxide to phenol. Generally, the impure cumene contains at least 90% cumene and there may be only a trace of impurities present, although such impurities have a very deleterious effect.

EXAMPLE 2

500 grams of commercial Dow cumene were mixed with a solution of 10 grams of sodium carbonate in 100 grams of distilled water. The mixture was oxidized with air for 24 hours at 100° C. The final pH was 8.1. Only 0.29% of cumene hydroperoxide was formed. The sodium carbonate was not effective to chelate the tin, selenium or arsenic poisons present in the cumene.

EXAMPLE 3

500 grams of commercial Dow cumene were refined by concentrated sulfuric wash, followed by dilute sodium hydroxide wash and distillation. This treatment removed phenols, acids and metal poisons. The refined cumene was mixed with a solution of 10 grams of sodium carbonate in 100 grams of distilled water. The mixture was oxidized by bubbling air therethrough at 100° C. for 24 hours. The final pH was 8.1. The yield of cumene hydroperoxide was 51.9% which was 10.6% greater than the yield of cumene hydroperoxide obtained

EXAMPLE 7

500 grams of commercial Dow cumene were mixed with 10 grams of sodium borate in 100 cc. of water. The mixture was divided into three equal parts, A, B and C, which were oxidized with air under the conditions set forth in Table I.

Table I

| Sample | Oxidation temperature, °C. | 4 Hours | | 16 Hours | | 32 Hours | | 64 Hours | | 128 Hours | |
|---|---|---|---|---|---|---|---|---|---|---|---|
| | | Yield, percent | Color | Yield, percent | Color | Yield, percent | Color | Yield, percent | Color | Yield, percent | Color |
| A | 100 | 5.1 | Pale | 30.9 | Tan | 52.6 | Brown | 56.3 | Dark brown | 55.9 | Black. |
| B | 80 | 2.9 | ...do | 12.9 | Pale | 19.3 | Pale | 26.9 | Tan | 39.6 | Light brown. |
| C | 60 | 0.9 | Clear | 2.2 | ...do | 6.9 | ...do | 14.9 | Pale | 23.2 | Pale. | in Example 1 under identical conditions, except omitting the sodium carbonate.

EXAMPLE 4

Ten gallons of crude cumene that was unsuitable for oxidation processing due to the presence of acidic and phenolic impurities were passed through a six foot long by two inch wide tube filled with small Raschig rings at the rate of ½ gallon per hour.

The packed column was filled with concentrated (10%) aqueous sodium carbonate. The cumene stream was introduced to the bottom of the column by pumping and rose through the packed column due to its lighter density than the aqueous sodium carbonate. The packing insured that the cumene would be in intimate contact with the sodium carbonate. The cumene overflowing from the top of the column was separated from the entrained sodium carbonate solution by a continuous separator. The cumene stream was then fed to the oxidation reactor and the separated sodium carbonate was returned to the purification tower.

EXAMPLE 5

Ten gallons of the same crude cumene as employed in Example 4 were introduced into the bottom of the tube described in Example 4 at the rate of ½ gallon per hour. The Raschig ring packed column was filled with 10% aqueous sodium carbonate. A stream of 10% aqueous sodium carbonate was concurrently fed into the bottom of the packed tower at a rate of 1/50 gallon per hour along with the cumene. The rate of feed of sodium carbonate was such as to maintain the effluent at a pH of about 8. The refined cumene-exhausted sodium carbonate streams were led from the top of the tower to a separator. The refined cumene was then led into the oxidation chamber where initiation of reaction was rapid due to the lack of trace poisons for the reaction. The exhausted sodium carbonate was removed from the system.

EXAMPLE 6

500 grams of the same commercial Dow cumene employed in Example 2 (i.e., unrefined) were mixed with a solution of 10 grams of sodium borate in 100 cc. of distilled water. The mixture was oxidized by bubbling air therethrough at 100° C. for 24 hours. The final pH was 8.0. The yield of cumene hydroperoxide was 48.2%. This was approximately 7% better than the results obtained utilizing a conventional acid-alkali refining procedure as in Example 1. The sodium borate process had the additional advantage of being simpler and more direct.

It has additionally been found that the purity of the cumene hydroperoxide obtained by oxidation of cumene with oxygen or a source thereof, e.g., air, can be increased by reducing the temperature of oxidation although the rate of oxidation is also retarded, as shown in Example 7.

The pH in every instance was 8.0 except for sample A after 128 hours, when the pH was 7.9.

The oxidation of cumene to cumene hydroperoxide by air or oxygen is extremely sensitive to poisons that inhibit the reaction, as explained above. The reaction is also peculiar in that attempts to produce substantially higher than 60% conversion of cumene to the hydroperoxide result in increased self-destruction of the cumene hydroperoxide with undesirable by-product formation.

It has now been found that if the oxidation is carried to the extent that the hydroperoxide content does not exceed 30%, a hydroperoxide of vastly improved quality is produced. Normally, the hydroperoxide content is between 5 and 25%. The quality of the product is also improved by using relatively moderate temperatures, e.g., 20–50° C. Most preferably, a combination of control of temperature of reaction and amount of hydroperoxide formation is employed.

Excess cumene may be removed from the cumene hydroperoxide with the aid of a continuous steam still, as described below. The recovered cumene can be rendered suitable for reuse by passage through a layer of sodium carbonate or sodium borate in the manner described earlier to remove phenol and other by-products formed.

As previously stated, as the amount of cumene converted to cumene hydroperoxide increases in the direction of the ultimate yield of about 60%, increasingly large amounts of impurities are obtained and, in fact, the oxidation to about 50% conversion of the cumene to cumene hydroperoxide results in a product having 14% of by-products.

EXAMPLE 8

3000 grams of cumene were added to a 5000 ml. flask, equipped with overflow valves, reflux, condenser, air intake line and thermometer. The cumene was heated to 40° C. and air added at a rate that the reaction temperature was maintained at 40° C. When the cumene hydroperoxide content rose to 25%, cumene was introduced at a rate to maintain the cumene hydroperoxide content at about 25%, while simultaneously withdrawing a mixture of cumene and cumene hydroperoxide at substantially the same rate as fresh cumene was added to the oxidation vessel. The fresh cumene was in part cumene recovered and recycled from a subsequent stage in the process of forming phenol and was in part added from a source external of the system.

EXAMPLE 9

Example 8 was repeated. The cumene-cumene hydroperoxide mixture removed from the flask was fed to the center of a steam still and the excess cumene stripped from the hydroperoxide by the steam. This cumene was refined for reuse by passage through a column of 10% aqueous sodium carbonate solution and then fed back into the oxidation vessel.

Example 9 illustrates another aspect of the invention, namely, separation of cumene from cumene hydroperoxide by steam distillation. It is common practice in making phenol from cumene to oxidize the cumene to cumene hydroperoxide and then split the hydroperoxide in the mixture to form acetone and phenol by dilute acid scission. The residual cumene is then separated from the phenol produced in an operation which is relatively expensive due to the close physical properties of the cumene and phenol.

In forming cumene hydroperoxide, it is essential to have excess cumene present due to the fact that the oxidation is self-destructive beyond about 60%, as previously set forth.

It has now been found that prior to scission of cumene hydroperoxide, it can be separated from cumene in a simple manner by steam distillation. Preferably, the mixture of cumene and hydroperoxide is fed into the center of the still. This procedure suffices to strip all the cumene from the technical cumene hydroperoxide. The relatively dangerous cumene hydroperoxide can thus be processed at low temperatures and "damped" with steam and water. The relatively small amount of hydroperoxide that goes overhead is returned to the oxidization vessel. Below the still a tank of cumene hydroperoxide and water is used as a receiver. The water is kept at a slow boil to insure complete stripping of the cumene. The cumene hydroperoxide-water stream removed from the receiver is separated continuously. The cumene hydroperoxide is fed into the first scission vessel. This avoids storage of the dangerous cumene hydroperoxide. The water is recycled to the receiver in order to avoid loss of the cumene hydroperoxide.

The cumene-cumene hydroperoxide mixture fed to the still generally contains 5–30% of the hydroperoxide. The overheads obtained from the still contain 2–5% of the hydroperoxide. In general, the larger the percentage of cumene hydroperoxide in the mixture fed to the still the higher the percentage of the hydroperoxide in the overheads.

EXAMPLE 10

A 1000 gram stream of a mixture of 80% cumene and 20% cumene hydroperoxide was fed into the center of a stripping still at the rate of 10 grams per minute. The stream was met by a current of steam introduced at the bottom of the still at the rate of 4 grams per minute and more steam from the boiling receiver at the rate of 1 gram per minute. The excess cumene is thus stripped from the cumene hydroperoxide as overheads and after condensation is separated from the excess water of condensation. The cumene is then refined by passing through a 10% aqueous sodium carbonate solution prior to reuse. (Alternatively, a 10% aqueous sodium borate solution can be used for the refining.)

The mixture of cumene hydroperoxide with water that condenses is allowed to flow downward and from the bottom of the still to the receiver. From the receiver, this mixture goes through a hydraulic valve into a continuous separator. The excess water is returned to the receiver, and the cumene hydroperoxide is then passed to the first scission vessel.

EXAMPLE 11

500 grams of a mixture of 73.8% cumene and 26.2% cumene hydroperoxide (prepared by a three stage oxidation of cumene) were fed into the center of a two foot heligrid packed column, one inch in diameter, and subjected to steam distillation. The distillate contained 32% water, 4% cumene hydroperoxide and 64% cumene. The bottoms contained 99.4% cumene hydroperoxide after drying.

The importance of removing the acidic materials present in cumene recovered by distillation prior to further oxidizing the cumene to cumene hydroperoxide is illustrated by the next two examples.

EXAMPLE 12

200 grams of cumene recovered by the steam distillation procedure recited in Example 11 and containing 4.2% of cumene hydroperoxide were oxidized at 100° C. by bubbling air therethrough for 24 hours. At the end of that time, the cumene hydroperoxide content was 4.6% and the pH was 5.2.

EXAMPLE 13

Example 12 was repeated, but before the oxidation step, the cumene was passed through a tower two feet high by one inch diameter, packed with ¼ inch Raschig rings and filled with 10% aqueous solution of sodium carbonate or sodium borate. The cumene containing 4.2% cumene hydroperoxide was introduced at the bottom of the tower and overflowed from the top. The cumene mixture had an original pH of 5.2 and after the sodium carbonate or sodium borate scrubbing, a pH of 8.0. After the oxidation step, the yield of cumene hydroperoxide was 42.6%. This clearly shows the importance of the alkali salt scrubbing.

The splitting of cumene hydroperoxide to acetone and phenol is known to take place in the presence of dilute acidic materials. It has now been found that this process can be improved by employing certain specific conditions. Thus, the yields, reaction rates and reaction conditions are drastically influenced by the catalyst choice. Only catalysts of high acidity give good conversions to the desired products with low amount of by-products. Preferably, the scission is carried out in a plurality of vessels. The cumene hydroperoxide is fed as a continuous stream into the first scission vessel. The acetone formed is distilled off as overheads. The phenol-acidic water-unsplit hydroperoxide stream is withdrawn in a continuous fashion through a hydraulic valve into another scission vessel, where the reaction of the unsplit hydroperoxide is completed and essentially hydroperoxide-free technical phenol and water are withdrawn through a separator. The acetone is removed from the second scission vessel also by distillation. The water containing phenol is fed to a purification device to recover the phenol, and the acidic water returned to the first scission vessel.

It has been found that a mixture of sulfuric acid and perchloric acid gives outstanding results as the catalyst. This mixture has the advantage over the use of perchloric acid alone of a much faster reaction time and a reduction in the known hazards from using this material. The use of sulfuric acid alone does not give as good yields as the catalyst mixture just described. In place of perchloric acid, salts thereof, e.g., sodium perchlorate and potassium perchlorate, can be used.

The catalyst mixture should contain 20–70% sulfuric acid, 0.2–35% perchloric acid and 30–80% water. The catalyst mixture is used in an amount of 10 to 70 parts per 100 parts of cumene hydroperoxide. The preferred catalyst mixture contains 33% sulfuric acid, 3% perchloric acid and 64% water. Higher concentrations of sulfuric acid tend to sulfonate or destructively oxidize the phenol. Additionally, too high concentrations of sulfuric acid catalyze the ketone-phenol reaction with the formation of unwanted tarry polymers. The reaction is carried out at 100° C. to the boiling point of the mixture. The reaction time is normally 30 to 90 minutes, of which 10 to 50% is in the first reaction vessel.

EXAMPLE 14

1000 grams of cumene hydroperoxide were slowly introduced into a corrosion resistant scission vessel containing 400 grams of water, 120 grams of sulfuric acid and 12 grams of perchloric acid. The reaction is carried out at 80° C. with agitation. The acetone produced was distilled off through a still. The average residence time of the mixture in the vessel was 30 minutes.

The phenol-unreacted cumene hydroperoxide-acidic water mixture was fed into a second reactor or scission vessel at a boil. The acetone-water vapors were fed back through the still of the first scission vessel. The average residence time in scission vessel two was 60 minutes. The overflow from the second scission vessel was continuously separated into an acidic water layer and a damp phenol layer, and the dissolved phenol in the acidic water phase was fed back to the first scission vessel, together with the necessary make-up water. The damp phenol layer was fed into suitable refining equipment.

EXAMPLE 15

The cumene hydroperoxide formed in Example 7 was converted into phenol by scission with 45% sulfuric acid. The scission procedure included (1) adding the cumene hydroperoxide over a one hour period, (2) holding at reflux temperature for 2 hours, (3) cooling and extracting with benzene, and (4) neutralizing with sodium bicarbonate and fractionating.

In Table II the times are those at which the samples of cumene hydroperoxide were collected (same as column 3 of Table I). The yields are those of U.S.P. phenol and the setting points of the crude phenol.

in yields of phenol obtained, but also in the considerable improvement in yields of acetone. This is shown in the following example.

EXAMPLE 17

2500 grams of refined Dow cumene were oxidized with air at 100° C. for 24 hours in the presence of a mixture of 10 grams of sodium borate in 100 cc. of water at a pH of 8.0. The yield of cumene hydroperoxide was 52.9%.

Five samples (A, B, C, D and E) of 500 grams each of the oxidation product (mixture of cumene and cumene hydroperoxide) were treated individually with a mixture of 140 grams of distilled water and 60 grams of sulfuric acid and an additional acid as follows:

10 grams of 36% hydrochloric acid were used with sample A;

40 grams of 36% hydrochloric acid were used with sample B;

10 grams of 33% perchloric acid were used with sample C;

Table II

| Sample | Oxidation tempera- ture, °C. | 4 hours | | 16 hours | | 32 hours | | 64 hours | | 128 hours | |
|---|---|---|---|---|---|---|---|---|---|---|---|
| | | Yield, percent | Setting point | Yield, percent | Setting point | Yield, percent | Setting point | Yield, percent | Setting point | Yield, percent | Setting point |
| A | 100 | 92.2 | Too small | 88.6 | 39.9° C | 86.4 | 32.5° C | 83.9 | Low | 69.1 | Low. |
| B | 80 | Too small | do | 90.6 | 38.2° C | 89.2 | 37.6° C | 88.2 | 36.8° C | 87.9 | 34.1° C. |
| C | 60 | do | do | Too small | Too small | 91.3 | Too small | 89.2 | 36.8° C | 89.9 | 34.9° C. |

From Table II it can be seen that if the oxidation reaction is allowed to continue for too long a time, the setting point of the phenol obtained in the subsequent scission reaction becomes unduly low. Additionally, the yield of the phenol based on the amount of cumene hydroperoxide tends to become low. This is especially noticeable with the phenol formed by scission of the cumene hydroperoxide formed at 100° C.

The effect of variation in the concentration of sulfuric acid in the scission of cumene is illustrated by the following example.

EXAMPLE 16

Dow cumene was refined by using sulfuric acid and sodium hydroxide in the manner described in Example 4. 2500 grams of the refined cumene were treated with 50 grams of sodium carbonate in 500 cc. of water. The thus treated cumene was oxidized with air at 100° C. for 24 hours. The pH of the mixture was 8.0. After phase separation, the organic phase contained 52.1% of cumene hydroperoxide.

Five samples (A, B, C, D and E) of 500 grams each of the organic phase were treated with sulfuric acid of various concentrations. The procedure in each case included adding the 500 grams of cumene-cumene hydroperoxide mixture at 100° C. over a period of one hour to the sulfuric acid and then holding the resulting mixture at 100° C. for 3 hours. Sample A was treated with 10% sulfuric acid, sample B with 30% sulfuric acid, sample C with 45% sulfuric acid, sample D with 60% sulfuric acid, and sample E with 70% sulfuric acid. The yields of phenol obtained after the sulfuric acid scission were as follows: Sample A, 61.6%; sample B, 86.2%; sample C, 89.2%; sample D, 82.2%, and sample E, 46.5%. The low yields with the more highly concentrated sulfuric acid are due at least in part to the formation of sulfonation by-products.

The use of a mixture of perchloric acid and sulfuric acid as previously set forth has numerous advantages in the scission of cumene hydroperoxide. This mixture, for example, is superior to the use of a mixture of hydrochloric acid and sulfuric acid not only in the increase 30 grams of 33% perchloric acid were used with sample D; and 90 grams of 33% perchloric acid were used with sample E.

The cumene-cumene hydroperoxide mixture in each case was added over a period of one hour at 100° C. to the mixture of acids and the resulting mixture held at 100° C. for three hours. The results obtained were as follows:

Table III

| Sample | Phenol yield | Acetone yield |
|---|---|---|
| A | 82.2 | 76.5 |
| B | 84.1 | 82.9 |
| C | 85.2 | 83.9 |
| D | 90.9 | 89.0 |
| E | 86.9 | 87.0 |

The advantages of using a mixture of sulfuric and perchloric acids over the use of sulfuric acid alone are shown in the next example.

EXAMPLE 18

2500 grams of the same refined Dow cumene used in Example 17 were oxidized with air at 80° C. for 48 hours in the presence of a mixture of 10 grams sodium borate in 100 cc. of water. The pH was 8.0. The yield of cumene hydroperoxide was 41.6%.

Five samples (A, B, C, D and E) of 500 grams each of the oxidation mixture of cumene and cumene hydroperoxide were treated individually with a 250 gram mixture of sulfuric acid and perchloric acid. A sixth sample of 250 grams of the oxidation mixture was treated with 250 grams of sulfuric acid without perchloric acid. The cumene-cumene hydroperoxide mixture was added over a period of one hour at 100° C. to the acidic material and the resulting mixture was held for three hours at 100° C. The results obtained, as well as the concentrations of reagents used, are shown in Table IV.

Table IV

| Sample | Sulfuric acid plus perchloric acid totals 250 grams | | Phenol yield, percent | Acetone yield, percent |
|---|---|---|---|---|
| | Sulfuric acid concentration, percent | Perchloric acid amount (33% concentration), grams | | |
| A | 30 | 30 | 89.6 | 82.6 |
| B | 35 | 30 | 91.2 | 84.3 |
| C | 40 | 30 | 92.6 | 89.2 |
| D | 40 | 45 | 94.2 | 90.6 |
| E | 40 | 60 | 91.9 | 86.2 |
| F | 40 | 0 | 88.8 | 83.9 |

It has been found that the oxidation of cumene to cumene hydroperoxide can be most advantageously carried out by using a plurality of reactors. Generally, the temperature is progressively decreased as the cumene is passed from one vessel to the next while the dwell time is increased. This procedure takes advantage of the fact that peroxide formation is induced most quickly at higher temperatures while, at the same time, the tendency to form undesirable by-products is minimized by lowering the temperature before such by-products are formed. Generally, three vessels are employed; in the first vessel the temperature may be from 130 to 80° C. and the dwell time, 4 to 24 hours; in the second vessel, the temperature may be from 100 to 60° C. and the dwell time, 8 to 48 hours; and in the third vessel, the temperature may be from 80 to 30° C. and the dwell time, 16 to 96 hours. For practical operation, the minimum difference in temperature between two successive vessels is 20° C. A typical example of this procedure follows:

EXAMPLE 19

2000 grams of Dow cumene refined as in Example 3 were mixed with 10 grams of sodium borate in 100 cc. of distilled water and oxidized with air in a series of three vessels. The first vessel had a capacity of 500 cc., the dwell time was 4 hours and the temperature was 100° C. The second vessel had a capacity of 1000 cc., the dwell time was 8 hours and the temperature was 80° C. The third vessel had a capacity of 2000 cc., the dwell time was 16 hours and the temperature was 60° C. At the end of the stay in the first vessel, the cumene hydroperoxide content was 5.9%; at the end of the stay in the second vessel, the cumene hydroperoxide content was 14.2%; and at the end of the stay in the third vessel, the cumene hydroperoxide content was 16.9%. 2000 grams of the cumene-cumene hydroperoxide mixture from the third oxidation vessel was introduced in the course of an hour into 200 grams of a mixture containing 56.7% water, 40% sulfuric acid and 3.3% of perchloric acid over a period of one hour at 100° C. It was held for 3 hours at 100° C. to complete the scission. Based on the hydroperoxide content, the yield of phenol was 95.1%, and of acetone, 91.6%.

EXAMPLE 20

The oxidation procedure of Example 19 was repeated except that there were employed a first vessel of 500 cc. capacity and dwell time of 4 hours at 100° C.; a second vessel of 2000 cc. capacity and dwell time of 16 hours at 80° C.; and a third vessel of 4000 cc. capacity and dwll time of 32 hours at 60° C. The cumene hydroperoxide at the end of the stay in the first vessel was 5.6%; at the end of the stay in the second vessel, 19.6%; and at the end of the stay in the third vessel, 24.2%.

The cumene-cumene hydroperoxide mixture from the third oxidation vessel was converted into phenol and acetone in identical fashion to that described in Example 19. The yield of phenol was 95.3% and of acetone, 91.9%.

It is possible to separate cumene from cumene hydroperoxide by using reduced pressure and a high vacuum still, e.g. 0.001 to 0.1 mm., although such a process is somewhat hazardous.

EXAMPLE 21

There was employed a 10 micron short path still. 500 cc. of oxidized cumene containing 28% of cumene hydroperoxide was distilled to 100° C. The distillate analyzed for 96% cumene and 4% cumene hydroperoxide. The residue upon scission and separation of the phenol formed was found to contain 4% of cumene in the phenol. This shows that while the separation of cumene from cumene hydroperoxide was good, it could still be improved upon.

Another method of separating cumene from cumene hydroperoxide is described in Example 22. This method is somewhat slow and less economical than several of the other methods previously described. This method also results in lower yields of phenol in the subsequent scission.

EXAMPLE 22

To 500 grams of a cumene-cumene hydroperoxide mixture containing 24.8% of the cumene hydroperoxide there was added 50% aqueous sodium hydroxide until the mixture was strongly alkaline (pH 12.5). The composition was chilled overnight at 0° C., and the sodium-cumene hydroperoxide precipitate filtered off. The precipitate was reacidified with dilute hydrochloric acid, extracted with benzene and the benzene extract converted to phenol using a mixture of sulfuric acid and perchloric acid in the manner described in Example 19. The yield of phenol was only 82.6% in contrast to the yield of 95.1% in Example 19.

The most advantageous method of preparing phenol from cumene involves a continuous process. A typical example of such a process is given in Example 23 and is also shown in the drawings.

The single figure of the drawings is a diagrammatic representation of the process.

Commercial cumene stream 2 enters into oxidation towers 4a, 4b and 4c in succession as cumene-cumene hydroperoxide stream 6 is withdrawn from tower 4c. Gas is removed from the tower through vent 8. Air enters the oxidation towers from line 10 and branches 10a, 10b and 10c through bubblers near the bottom of towers 4a, 4b and 4c. Prior to entering tower 4, the crude cumene is blended with a small amount of aqueous sodium borate in line 5. In addition to the crude cumene, there is also fed recycle cumene through line 12 into the oxidation tower. From the tower the cumene-cumene hydroperoxide passes through sodium borate line 14 to center of steam still 16. The cumene is entrained by the steam entering the bottom of still 16 through line 18 and is carried off through line 20 having attached condenser 21, into separator 22. Water is removed through line 24 and the cumene containing minor amounts of cumene hydroperoxide passes through line 26 to aqueous sodium carbonate scrubber 28 and is recycled to oxidation tower 4. Fresh sodium carbonate solution enters scrubber 28 through line 30 and exhausted sodium carbonate is removed through line 32. The bottoms from the still pass into receiver 36 which is maintained at a boil. The crude cumene hydroperoxide passes from line 38 into phase separator 40 and water is removed through line 42. The cumene hydroperoxide goes through line 44 into the first stage 46 of a two-stage reactor containing water, sulfuric acid and perchloric acid. The first stage is heated and acetone is removed through condenser 48. From the first stage, the mixture of phenol, acids and residual cumene hydroperoxide passes through line 50 into second heated stage 52 where the splitting reaction is completed. Acetone, water and other volatiles are recycled to condenser 48 and the acetone recovered as overheads. The mixture of phenol and acids passes from the second stage through line 54 to separator 56 in which the phenol is separated and sent to refining. The acid is removed as bottoms and recycled. Crude, wet, acidic phenol passes from the top of separator 56 through line 58 into a first fractionating tower 60. Water, sulfur dioxide and other volatiles come over as overheads and the crude phenol descends to reboiler 62. From the reboiler, the crude phenol passes through line 64 to a second fractionating tower 66. U.S.P. phenol is recovered as overheads from this tower and the heavier components descend to reboiler 68 and thence through line 70 to a third fractionating tower 72 from which acetophenone is recovered as overheads and tar as bottoms in receiver 74.

EXAMPLE 23

125 grams per hour of commercial impure Dow cumene were fed into a 500 cc. tower maintained at 100° C. The cumene feed had 5 grams of sodium borate and 25 grams of water mixed therewith for every 1000 grams of cumene. The average dwell time in the tower was 4 hours. The cumene hydroperoxide content of the mixture emerging from the tower was 9.9% and the pH 8.0. The mixture then passed to a second chamber of 2000 cc. capacity and stayed therein for 16 hours at 80° C. and a pH of 8.0. The chamber contained 5 grams of sodium borate and 100 grams of water per 1000 grams of cumene-cumene hydroperoxide mixture. The cumene hydroperoxide content rose to 23.9% in this chamber. From the second chamber, the cumene-cumene hydroperoxide mixture passed to a third chamber of 4000 cc. capacity and remained therein for 32 hours. The cumene hydroperoxide content rose to 29.6% and the pH remained at 8.0. The mixture was then fed at the rate of 125 grams per hour to the center of a 4 foot high by 2 inch diameter heligrid packed columnar still and 60 grams of steam per hour passed upwardly from the base of the columnar still. The overheads are separated into two phases. The organic phase (cumene-cumene hydroperoxide) is passed through a column 2 feet high by 2 inch diameter packed with Raschig rings and filled with 10% aqueous sodium carbonate and then recycled to the 500 cc. tower. The recycled mixture contains 4.0% cumene hydroperoxide. After return of the recycle to the tower, the device was set to feed at constant demand, i.e., sufficient cumene was fed into the tower to replace that lost as cumene hydroperoxide as bottoms from the still. The cumene hydroperoxide phase separated from the bottom of the steam still was 89.2% cumene hydroperoxide on an as is basis and 99.3% after drying.

The cumene hydroperoxide formed was continuously split into phenol and acetone in the following manner:

2500 grams of cumene were converted to cumene hydroperoxide in the manner just described in this example and the cumene hydroperoxide was continuously fed into a two-stage reactor. In the first stage, 140 cc. of distilled water, 60 grams of sulfuric acid and 45 grams of 33% perchloric acid were placed in a 500 cc. vessel, maintained at 80° C. 150 grams of cumene hydroperoxide were added and allowed to remain for one hour; the mixture was then allowed to overflow and separated into an organic phase and an acidic phase. The acidic phase was recycled to the first stage vessel and make-up cumene hydroperoxide added at a rate to keep the dwell time at one hour. The acetone formed was removed through a still. The organic phase which contained crude phenol and unsplit cumene hydroperoxide was sent to a second stage vessel of 2000 cc. capacity maintained at 100° C. and containing 560 cc. of distilled water, 240 grams of sulfuric acid and 180 grams of 33% perchloric acid. The crude phenol and cumene hydroperoxide had a dwell time of 3 hours in stage two and amounted to 600 grams. The acetone formed in the second vessel was removed as overheads through the same still employed in the first stage. The organic phase was separated from the acidic phase after overflowing from the second stage and the acidic phase returned to the second stage. Make-up acid was employed to maintain the volume. The phenol formed was neutralized with sodium bicarbonate and distilled. The yield of products was 1850 grams of phenol, 94% yield, 1393 grams of acetone, 90% yield, and 96 grams of acetophenone.

I claim:
1. A process of purifying impure cumene of at least 90% concentration comprising washing the impure cumene with aqueous sodium borate.
2. A process according to claim 1 wherein the sodium borate solution is about 10% concentration.
3. A process according to claim 1 wherein the pH is maintained between about 6 and 12.
4. A process according to claim 1 wherein the pH is maintained at about 8.

References Cited in the file of this patent

UNITED STATES PATENTS

| | | |
|---|---|---|
| 1,916,627 | Mersch | July 4, 1933 |
| 2,002,627 | Canon | May 28, 1935 |
| 2,357,298 | Haven | Sept. 5, 1944 |
| 2,516,649 | Rust et al. | July 25, 1950 |
| 2,538,262 | Murray | Jan. 16, 1951 |
| 2,548,435 | Lorand et al. | Apr. 10, 1951 |
| 2,564,717 | Olsen | Aug. 21, 1951 |
| 2,621,213 | Joris | Dec. 9, 1952 |
| 2,628,983 | Aller et al. | Feb. 17, 1953 |
| 2,632,772 | Armstrong et al. | Mar. 24, 1953 |
| 2,706,708 | Frank et al. | Apr. 19, 1953 |
| 2,737,527 | Mosnier | Mar. 6, 1956 |
| 2,813,907 | Vlugter | Nov. 19, 1957 |
| 2,855,437 | Lyons | Oct. 7, 1958 |

FOREIGN PATENTS

| | | |
|---|---|---|
| 676,770 | Great Britain | Aug. 6, 1952 |
| 689,734 | Great Britain | Apr. 1, 1953 |
| 522,886 | Belgium | Oct. 15, 1953 |
| 507,625 | Canada | Nov. 23, 1954 |

OTHER REFERENCES

Kharasch et al.: Jour. Org. Chem., vol. 15 (1950), pp. 748–749 (2 pp.: entire article pages 748–752)